(12) United States Patent
Saitoh (10) Patent No.: US 9,799,022 B2
(45) Date of Patent: Oct. 24, 2017

(54) PORTABLE SETTLEMENT TERMINAL DEVICE

(71) Applicant: PANASONIC INTELLECTUAL PROPERTY MANAGEMENT CO., LTD., Osaka (JP)

(72) Inventor: Kazuki Saitoh, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/706,124

(22) Filed: May 7, 2015

(65) Prior Publication Data
US 2015/0324781 A1 Nov. 12, 2015

(30) Foreign Application Priority Data
May 8, 2014 (JP) ................................. 2014-096905

(51) Int. Cl.
*G06Q 20/00* (2012.01)
*G06Q 20/20* (2012.01)
(Continued)

(52) U.S. Cl.
CPC ........... *G06Q 20/206* (2013.01); *G06Q 20/20* (2013.01); *G06Q 20/204* (2013.01);
(Continued)

(58) Field of Classification Search
None
See application file for complete search history.

(56) References Cited

U.S. PATENT DOCUMENTS

| 5,970,146 A | 10/1999 | McCall et al. |
| 8,261,064 B2 * | 9/2012 | Ditzman ................. G06F 21/83 |
| | | 178/18.01 |

(Continued)

FOREIGN PATENT DOCUMENTS

| EP | 2884470 | 6/2015 |
| JP | 2001-256409 | 9/2001 |

(Continued)

OTHER PUBLICATIONS

The Extended European Search Report from the European Patent Office (EPO) dated Aug. 31, 2015 for the related European Patent Application No. 15165454.8.

(Continued)

*Primary Examiner* — Florian Zeender
*Assistant Examiner* — Christopher Buchanan
(74) *Attorney, Agent, or Firm* — Greenblum & Bernstein, P.L.C.

(57) ABSTRACT

In an information processing device (settlement terminal device), a first main body that accommodates a first information processing unit in a first housing including a first input display unit (first touch panel), and a second main body that includes a second housing from which a seat unit for detachably attaching the first main body extends, and accommodates a secure second information processing unit which includes a second input display unit (second touch panel) disposed in the second housing to be on the same plane as that of the first input display unit of the first main body attached to the seat unit, and which has tamper resistance, are provided. In the information processing device, the first input display unit and the second input display unit are preferably arranged on the same plane. A secure portion can secure physically high tamper-resistance performance and the high robustness of the entire device.

20 Claims, 6 Drawing Sheets

(51) Int. Cl.
*G06Q 20/32* (2012.01)
*G06Q 20/38* (2012.01)
*G06Q 20/40* (2012.01)
*G07F 7/08* (2006.01)

(52) U.S. Cl.
CPC ......... *G06Q 20/322* (2013.01); *G06Q 20/382* (2013.01); *G06Q 20/4012* (2013.01); *G07F 7/0873* (2013.01); *G07F 7/0886* (2013.01); *G07F 7/0893* (2013.01)

(56) References Cited

U.S. PATENT DOCUMENTS

| | | | |
|---|---|---|---|
| 2003/0006998 A1 | 1/2003 | Kumar | |
| 2004/0024710 A1* | 2/2004 | Fernando | G06F 21/6218 705/50 |
| 2004/0167820 A1 | 8/2004 | Melick et al. | |
| 2005/0222958 A1 | 10/2005 | Hasegawa et al. | |
| 2006/0105722 A1* | 5/2006 | Kumar | G06F 1/1632 455/90.3 |
| 2009/0243872 A1* | 10/2009 | Takahashi | G06F 21/85 340/687 |
| 2009/0254986 A1* | 10/2009 | Harris | G06F 21/74 726/17 |
| 2010/0145854 A1* | 6/2010 | Messerges | G06Q 20/32 705/44 |
| 2010/0251361 A1* | 9/2010 | Collopy | G06F 1/1616 726/19 |
| 2011/0138464 A1* | 6/2011 | Ohta | G06F 21/74 726/22 |
| 2014/0164252 A1 | 6/2014 | Chai et al. | |
| 2015/0161601 A1 | 6/2015 | Matsumoto et al. | |
| 2015/0324615 A1* | 11/2015 | Matsumoto | G06F 21/74 726/34 |

FOREIGN PATENT DOCUMENTS

| | | |
|---|---|---|
| JP | 2003-157239 | 5/2003 |
| JP | 2005-293058 | 10/2005 |
| JP | 2006-195599 | 7/2006 |
| JP | 2008-160891 | 7/2008 |
| JP | 2008-244992 | 10/2008 |
| JP | 2009-245139 | 10/2009 |
| JP | 2011-095840 | 5/2011 |
| JP | 2012-185544 | 9/2012 |
| JP | 2012-521601 | 9/2012 |
| JP | 2014-514669 | 6/2014 |
| JP | 2011-138477 | 7/2014 |
| WO | 2004/017613 | 2/2004 |
| WO | 2012/149907 | 11/2012 |

OTHER PUBLICATIONS

U.S. Appl. No. 14/706,135 to Manabu Matsumoto et al., filed May 7, 2015.

* cited by examiner

PORTABLE SETTLEMENT TERMINAL DEVICE

BACKGROUND OF THE INVENTION

1. Field of the Invention

The present invention relates to a portable settlement terminal device used to perform a procedure of a settlement process in transaction.

2. Description of the Related Art

In credit transaction of goods or services using a credit card, security of the transaction is ensured by confirming (identity verification) whether or not a person who conducts the transaction and a possessor of the credit card used for the transaction are the same person. The identity verification is performed by writing a signature by a customer on a transaction slip which is output at the time of a transaction process of the transaction and on which the transaction content is printed, and comparing this signature with a signature described on the credit card by a clerk through a visual check.

In recent years, a terminal device capable of inputting and displaying such a signature is implemented using a smart phone or a tablet terminal. Many smart phones or tablet terminals can be used as settlement terminal devices by being distributed as devices for consumers and being supplied at low prices. That is, the settlement terminal devices can be supplied at low prices as long as many information terminals distributed for consumers such as smart phones or tablet terminals can be used as the settlement terminal devices. Since development platforms of applications (software) used for other tasks other than a settlement process can be generalized, it is easy to reuse or apply development resources thereof.

However, the information terminals designed so as to be used as devices for consumers do not have "tamper resistance" required to safely perform the transaction by protecting information regarding a customer. The "tamper resistance" refers to resistance to attack that tries to steal information from the information terminal. In order to secure the tamper resistance as a countermeasure of the attack that tries to steal information from the information terminal, a mobile device in which a portion (that is, a "secure portion" which is a portion having the tamper resistance required as the settlement terminal device) related to authentication information of a card used for the settlement process is separated from a general portion has been suggested (for example, see U.S. Patent Unexamined Publication No. 2010/0145854).

A mobile information registration device that is detachably attached to a hand-held input/output unit has been suggested (for example, see International Publication No. 2004/017613).

However, in the aforementioned information processing device of the related art, security of the secure portion is ensured, but security of a non-secure portion is generally insufficient. For this reason, when an illegal application is installed in the non-secure portion, there is a possibility that a regular input region for inputting authentication information (for example, personal identification number (PIN) or signature) for identity verification will be illegally hidden. Further, there is a possibility that another illegal input region will be displayed due to the illegal application. For the circumstance described above, there is a possibility that a user mistakes the illegal input region as the regular region and inputs authentication information in the illegal input region, and thus, the authentication information will be stolen (phished).

Even when the information processing device includes the secure portion and the non-secure portion (general processing portion), the information processing device needs to have robustness (for example, falling impact resistance). In the technology described in International Publication No. 2004/017613, a hollow outer plate to which the mobile information registration device is detachably attached is provided in the input/output unit, but the input/output unit does not need to secure the "tamper resistance".

SUMMARY OF THE INVENTION

In a portable settlement terminal device of the present disclosure, a secure portion can secure physically high tamper-resistance performance and the high robustness of the entire device.

A portable settlement terminal device of the present disclosure includes: a first housing main body that accommodates a non-secure first information processing unit including a first input display unit which displays amount of money related to settlement; and a second housing main body that accommodates a secure second information processing unit including a second input display unit to which authentication information of a card used for settlement is input. When a seat unit to which the first housing main body is detachably attached extends from the second housing main body and the first housing main body is attached to the seat unit, the first input display unit and the second input display unit are provided on the same plane.

According to the portable settlement terminal device of the present disclosure, the secure second information processing unit can be disposed while being physically separated from the first information processing unit. Thus, the second information processing unit can be intensively disposed in a necessary minimum space. Accordingly, the second information processing unit can easily secure tamper resistance (security). The operator can easily recognize that the second input display unit is the secure input region by separately providing the second input display unit for security in addition to the first input display unit. As stated above, the portable settlement terminal device can notify that the second input display unit is a region that guarantees input safety of the authentication information (PIN or the like) to the operator. As a result, the authentication information can be safely input, and a secure process of the input authentication information is realized. That is, according to the portable settlement terminal device, the secure portion can secure physically high tamper-resistance performance and the high robustness of the entire device.

DETAILED DESCRIPTION OF THE PREFERRED EMBODIMENTS

Exemplary embodiments of a settlement terminal device according to the present disclosure will be described with reference to the drawings. In the following embodiments, as an example of a settlement terminal device according to the present disclosure, a settlement terminal device used for a settlement process in transactions of goods or services will be described.

First Exemplary Embodiment

Figure 1A:
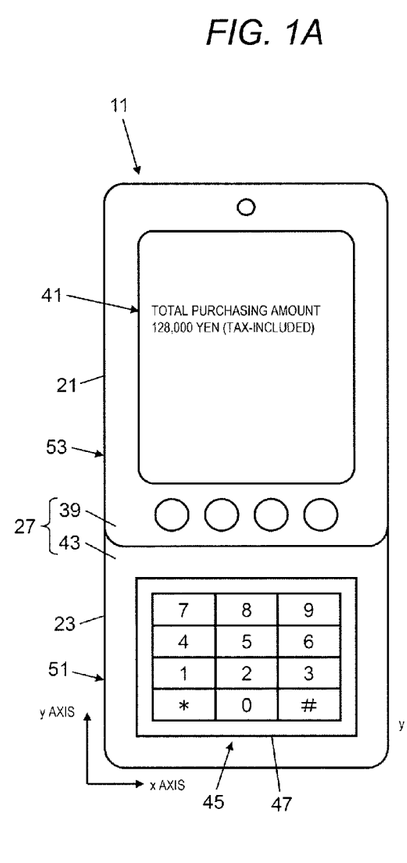
FIG. 1A is a front view of a settlement terminal device according to a first exemplary embodiment.
Figures 1B, 1C:
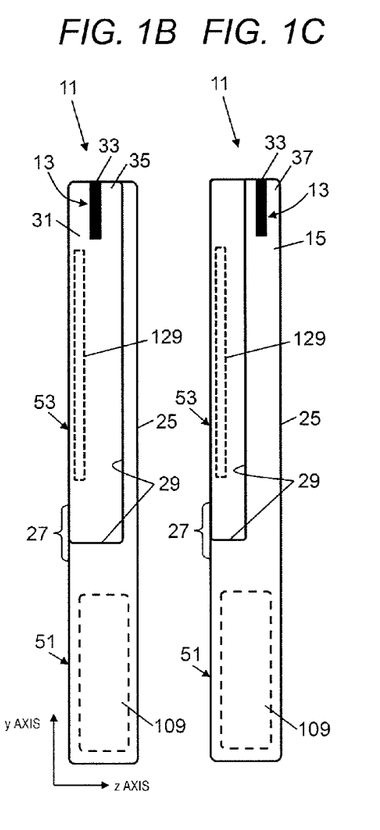
FIG. 1B is a side view of the settlement terminal device shown in FIG. 1A.
FIG. 1C is a side view when a magnetic card reader of the settlement terminal device shown in FIG. 1A is disposed at a seat-unit upper end.

FIG. 1A is a front view of settlement terminal device 11 according to a first exemplary embodiment. FIG. 1B is a side view of settlement terminal device 11 shown in FIG. 1A. FIG. 1C is a side view when magnetic card reader 13 of settlement terminal device 11 shown in FIG. 1A is disposed at seat-unit upper end 15.

Settlement terminal device 11 of the present exemplary embodiment is a portable type, and includes first information processing unit 17 (see FIG. 4), and second information processing unit 19 which perform various information processes including a settlement process in transactions of, for example, goods or services. First information processing unit 17 is accommodated in first housing 21. Second information processing unit 19 is accommodated in second housing 23.

A first input display unit (specifically, first touch panel 41) is provided at first housing 21. A second input display unit (specifically, second touch panel 45) is provided at second housing 23. A seat unit 25 to which first housing 21 is detachably attached extends from second housing 23. When first housing 21 is attached to seat unit 25 of second housing 23, the first input display unit (first touch panel 41) and the second input display unit (second touch panel 45) are arranged on the same surface. Second information processing unit 19 accommodated in second housing 23 is a secure information processing unit having tamper resistance.

In settlement terminal device 11, the first input display unit and the second input display unit are arranged on the same plane. The same plane on which the first input display unit and the second input display unit are arranged is operation surface 27. The second input display unit is disposed on operation surface 27 in front of the first input display unit. In the following exemplary embodiments, the "front" refers to a lower side of second housing 23 erected in a direction in which operation surface 27 is parallel to a vertical line, and a side close to an operator when holding first housing 21 and second housing 23 such that operation surface 27 is parallel to a surface that is substantially perpendicular to the vertical line. Accordingly, in settlement terminal device 11 of the present exemplary embodiment, when first housing 21 and second housing 23 are erected such that the first input display unit (first touch panel 41) and the secure second input display unit (second touch panel 45) which are present on operation surface 27 are arranged in a direction parallel to the vertical line, the second input display unit (second touch panel 45) is disposed on a lower side of second housing 23.

Settlement terminal device 11 is a portable type, and includes first information processing unit 17 and "secure" second information processing unit 19 described above. "Secure" means that the unit has tamper resistance. "Tamper" refers to illegal analysis and modification of software or hardware within an information processing device (for example, settlement terminal device 11), illegal piracy and modification of information within the information processing device (for example, settlement terminal device 11), and attack to allow the information to be disabled. Accordingly, the "tamper resistance" refers to resistance to such attack. For example, by having the tramper resistance, information regarding a customer is protected in the settlement process, and thus, it is possible to safely perform a transaction.

Settlement terminal device 11 is configured such that first information processing unit 17 and second information processing unit 19 can be coupled to each other on coupling surface 29. First information processing unit 17 may be "secure", or may be "non-secure". "Non-secure" means that the region has no tamper resistance or the region has low tamper-resistance performance.

In settlement terminal device 11, magnetic card reader unit 13 is disposed at housing upper end 31 of first housing 21 or seat-unit upper end 15 of seat unit 25 on a side (non-secure side) opposite to the second input display unit with the first input display unit interposed therebetween. Magnetic card reader unit 13 includes slit 33. Slit 33 is a path through a magnetic card is slid to read a magnetic stripe of the magnetic card. Slit 33 can be formed in housing upper end surface 35 or seat-unit upper end surface 37. As shown in FIG. 1B, settlement terminal device 11 can decrease the thickness of seat unit 25 by forming slit 33 in housing upper end surface 35.

For the sake of convenience in description, it is assumed that operation surface 27 is an orthogonal surface of an X axis and a Y axis. It is assumed that an axis perpendicular to the X axis and the Y axis is a Z axis. A direction parallel to the Z axis is a thickness direction of settlement terminal device 11. A direction parallel to the X axis is a width direction, and a direction parallel to the Y axis is a height direction.

As shown in FIG. 1C, slit 33 is formed in seat upper end surface 37, and thus, settlement terminal device 11 can decrease the thickness of first housing 21. In a structure (that is, structure in which magnetic card reader 13 is provided at seat unit 25) in which slit 33 is formed in seat-unit upper end surface 37, the thickness of seat unit 25 is increased. In this case, it is possible to increase strength of seat unit 25.

Settlement terminal device 11 includes two input units and display units (that is, first input display unit and second input display unit), that are two touch panels. Specifically, first touch panel 41 which is the first input display unit is provided on first operation surface 39 provided at first information processing unit 17, and second touch panel 45 which is the second input display unit is provided on second operation surface 43 provided at second information processing unit 19. First touch panel 41 displays, for example, amount-of-money information, and receives an amount of money input. Second touch panel 45 displays, for example, PIN input screen 47, and receives a PIN input.

Figures 2A, 2B, 2C:
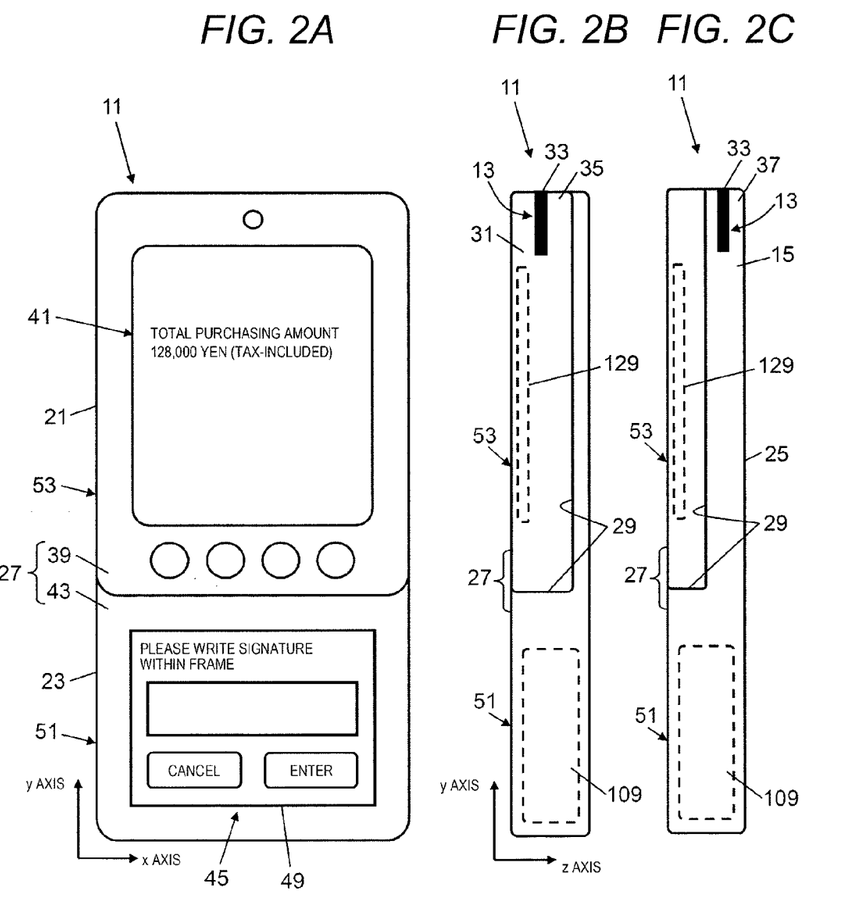
FIG. 2A is a front view showing a display example of a signature input screen in the settlement terminal device of the first exemplary embodiment.
FIG. 2B is a side view of the settlement terminal device shown in FIG. 2A.
FIG. 2C is a side view when the magnetic card reader of the settlement terminal device shown in FIG. 2A is disposed at the seat-unit upper end.

FIG. 2A is a front view showing a display example of signature input screen 49 in settlement terminal device 11 of the first exemplary embodiment. FIG. 2B is a side view of settlement terminal device 11 shown in FIG. 2A. FIG. 2C is a side view when magnetic card reader 13 of settlement terminal device 11 shown in FIG. 2A is disposed at seat-unit upper end 15.

First touch panel 41 can display, for example, amount-of-money information as non-secure content, and second touch panel 45 can display, for example, signature input screen 49 as secure content.

Figure 3:
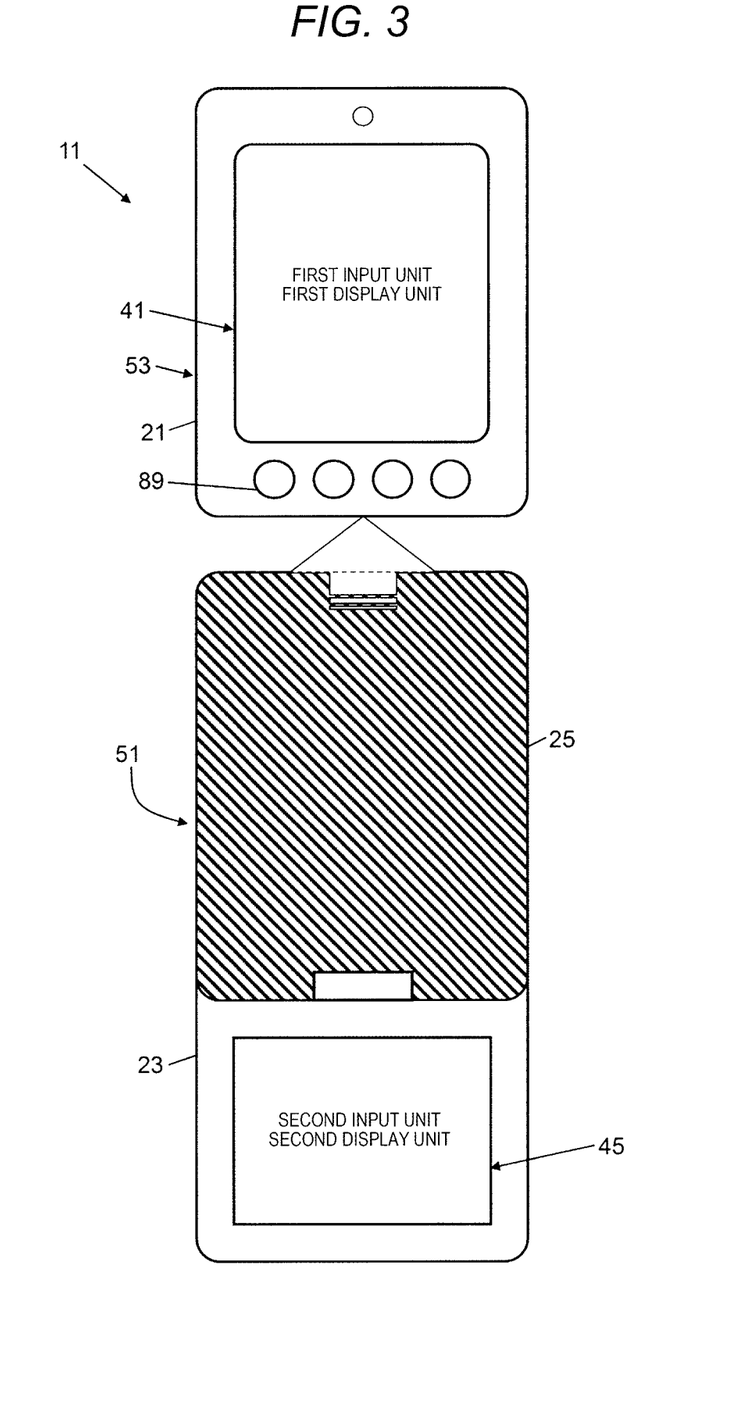
FIG. 3 is an exploded plan view showing a state in which a first housing main body is exploded from a second housing main body of the settlement terminal device shown in FIGS. 1A to 1C.

FIG. 3 is an exploded plan view showing a state in which first main body 53 is exploded from second main body 51 of settlement terminal device 11 shown in FIGS. 1A to 1C.

A lock structure (not shown) capable of integrally fixing these housings to each other or unfixing these housings is provided at second housing 23 and first housing 21. The lock structure may include a claw section formed at one of second housing 23 and first housing 21, and a lock section that engages with this claw section and releases the engagement.

Figure 4:
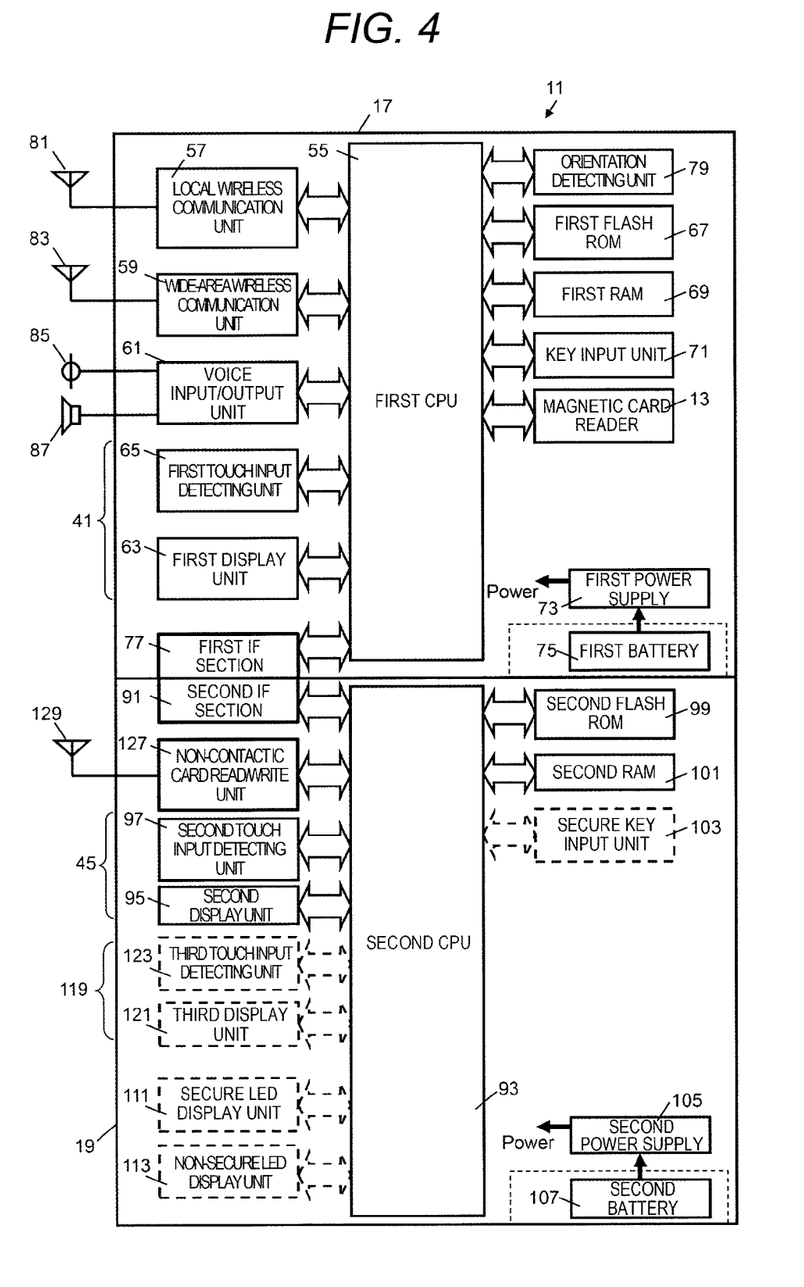
FIG. 4 is a block diagram showing an example of hardware configuration of the settlement terminal device of the first exemplary embodiment.

FIG. 4 is a block diagram showing an example of hardware configuration of settlement terminal device 11 of the first exemplary embodiment. In settlement terminal device 11, first information processing unit 17 is provided in first housing 21, and second information processing unit 19 is provided in second housing 23.

First information processing unit 17 shown in FIG. 4 includes first central processing unit (CPU) 55, local wireless communication unit 57, wide-area wireless communication unit 59, voice input/output unit 61, first display unit 63, and first touch input detecting unit 65. First information processing unit 17 includes first flash read-only memory (ROM) 67, first random-access memory (RAM) 69, key input unit 71, magnetic card reader 13, first power supply 73, first battery 75, and first interface (IF) section 77. First information processing unit 17 may include an orientation detecting unit 79.

In first information processing unit 17, the respective units are connected to first CPU 55. First CPU 55 generalizes the entire first information processing unit 17, and performs, for example, controlling, processing, setting, determining, deciding, and confirming in various manners.

Local wireless communication unit 57 is connected to local wireless communication antenna 81, and has a function of performing, for example, wireless local area network (LAN) communication using a local wireless communication path (not shown). Local wireless communication unit 57 may perform communication (for example, Bluetooth (registered trademark) communication) other than wireless LAN communication.

Wide-area wireless communication unit 59 is connected to wide-area wireless communication antenna 83, and has a function of performing communication through a non-illustrated wide-area wireless communication path (for example, wide area network (WAN)). Communication in wide-area wireless communication path may be performed using, for example, a mobile telephone network such as wideband code division multiple access (W-CDMA), universal mobile telecommunications system (UMTS), code division multiple access (CDMA) 2000, or long term evolution (LTE).

Voice input/output unit 61 is connected to microphone 85 and speaker 87, and has a function of controlling an input or an output of a voice. For example, voice input/output unit 61, microphone 85, speaker 87, and wireless telephone network communication unit (not shown) can make a telephone call with another mobile phone or landline telephone. For example, when a user (clerk or customer) operates settlement terminal device 11, speaker 87 is used to produce a sound for giving a warning notice to the user or a warning sound indicating an operation error.

First display unit 63 has a function of controlling a display on first touch panel 41 (see FIG. 1A). First touch input detecting unit 65 has a function of detecting a touch input on first touch panel 41.

First flash ROM 67 has a function of storing various data. The stored data may be data related to tasks, or may be programs for controlling settlement terminal device 11 (for example, first information processing unit 17).

For example, when arithmetic processing according to operations of settlement terminal device 11 (for example, first information processing unit 17) is performed, first RAM 69 is a memory used for temporarily storing process data generated during the arithmetic processing.

Key input unit 71 has, for example, a function of receiving an input from input key 89 shown in FIG. 1A. Magnetic card reader unit 13 is disposed within slit 33 in FIGS. 1B and 1C, and has a function of reading the magnetic stripe of the magnetic card.

First power supply 73 is primarily a power supply of first information processing unit 17, receives power from first battery 75, and supplies power to the respective units of first information processing unit 17 (for example, first CPU 55). First CPU 55 can supply power and stop supplying of power with respect to some or all of circuits constituting first information processing unit 17 by controlling first power supply 73. First CPU 55 may supply power to second information processing unit 19 by controlling first power supply 73.

First information processing unit 17 and second information processing unit 19 are connected to each other through the first interface section (hereinafter, referred to as "first IF section 77") and the second interface section (hereinafter, referred to as "second IF section 91), and various data or commands are delivered therebetween. First IF section 77 and second IF section 91 can be coupled to each other.

Second information processing unit 19 shown in FIG. 4 includes second IF 91, second CPU 93, second display unit 95, second touch input detecting unit 97, second flash ROM 99, second RAM 101, secure input unit 103, and second power supply 105. In the present exemplary embodiment, orientation detecting unit 79 is provided at first information processing unit 17, but may be provided at second information processing unit 19.

In second information processing unit 19, the respective units are connected to second CPU 93. Second CPU 93 generalizes the entire second information processing unit 19, and performs, for example, various controlling, processing (for example, settlement process), setting, determining, deciding, confirming, authenticating, and comparing (for example, comparing of PINs or signatures).

Second display unit 95 has a function of controlling a display on second touch panel 45 (see FIG. 1A). Second touch input detecting unit 97 has a function of detecting a touch input on second touch panel 45.

Second flash ROM 99 has a function of storing various data. The stored data may be data related to tasks, or may be programs for controlling (for example, second information processing unit 19) of settlement terminal device 11.

When arithmetic processing according to the operation of settlement terminal device 11 (for example, second information processing unit 19) is performed, second RAM 101 is a memory used to temporarily store process data generated during the arithmetic processing.

Secure input unit 103 may have, for example, a physical key or a soft key for inputting the PIN. For example, a signature may be input to secure input unit 103. For example, the PIN may be input to secure input unit 103 in a handwriting manner by using, for example, a fingerprint or a stylus pen.

Although not shown in FIGS. 1A to 2C, for example, in FIGS. 1A to 1C, secure input unit 103 may be disposed on a rear surface of second information processing unit 19. The rear surface of second information processing unit 19 is a surface opposite to second operation surface 43 on which second touch panel 45 is provided.

Second power supply 105 is primarily a power supply of second information processing unit 19, receives power from second battery 107, and supplies power to the respective units (for example, second CPU 93) of second information processing unit 19. Second CPU 93 can supply power and stop supplying of power with respect to some or all of circuits constituting second information processing unit 19 by controlling second power supply 105. Second CPU 93 may supply power to first information processing unit 17 by controlling second power supply 105.

Settlement terminal device 11 includes orientation detecting unit 79 that detects the orientation of settlement terminal device 11 with respect to gravity. For example, orientation detecting unit 79 is provided in at least one of first information processing unit 17 and second information processing unit 19. Orientation detecting unit 79 may be implemented using, for example, an acceleration sensor. FIG. 4 illustrates an example in which orientation detecting unit 79 is provided in first information processing unit 17.

In settlement terminal device 11, "secure" or "non-secure" first information processing unit 17 and "secure" second information processing unit 19 can be coupled to each other. The inputting and displaying of authentication information (for example, signature or PIN information) of a card used for settlement are performed on second touch panel 45 provided on "secure" second information processing unit 19. Accordingly, settlement terminal device 11 can input and display the authentication information regarding the card used for the settlement, and can secure the "tamper resistance". A "secure" portion requiring the "tamper resistance" is implemented as secure module 109 localized in second information processing unit 19.

Since secure module 109 has the tamper resistance, reading of confidential data due to non-regular means is prevented. In order to increase the tamper resistance, there are a method of increasing confidentiality so as not to allow the data to be read from the outside and a method of providing a mechanism that detects whether or not the physical blockage of secure module 109 is canceled. When it is detected that the physical blockage of secure module 109 is canceled, secure module 109 may not allow the data to be read from the outside, or the program or data within secure module 109 may be destroyed. Secure module 109 may use these methods. The method that does not allow the data to be read from the outside is implemented by storing software which encrypts the program, decodes the encrypted program as much as necessary at the time of executing, and executes the decoded program. With regard to the reading from the outside, the method of destroying the program or data is implemented by providing a circuit which removes confidential information or stably deletes the information by rewriting the information with a predetermined value or a circuit which is not operated when the blockage of secure module 109 is canceled.

Meanwhile, as first information processing unit 17, for example, many information terminals (for example, smart phones and tablet terminals) distributed as devices for consumers may be used. For example, a general-purpose operating system is applied to first information processing unit 17, as software platform.

Accordingly, development resources of application software (hereinafter, referred to as a "settlement application") for the settlement and application software (hereinafter, referred to as a "task application") used for other tasks are easily reused or applied. The settlement application and another task application are flexibly operated without stress by being processed by first information processing unit 17 having, for example, high arithmetic processing ability.

Figure 5:
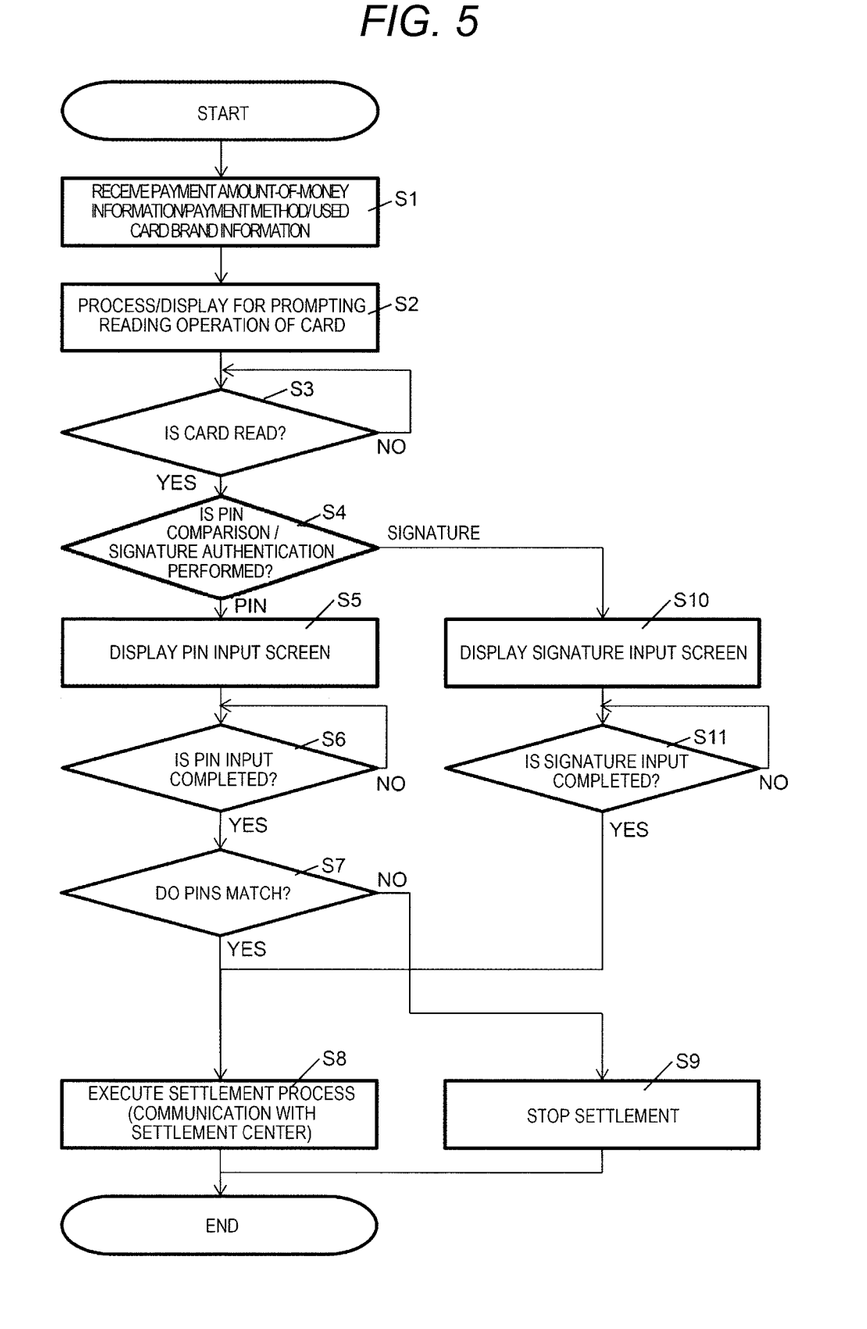
FIG. 5 is a flowchart for describing an operation procedure of the settlement terminal device of the first exemplary embodiment during the settlement process.

Next, the operation of settlement terminal device 11 of the present exemplary embodiment during the settlement process will be described with reference to FIG. 5. FIG. 5 is a flowchart for describing an operation procedure of settlement terminal device 11 of the first exemplary embodiment during the settlement process.

Settlement terminal device 11 starts a settlement procedure by executing the settlement application (not shown) installed in first information processing unit 17. Specifically, the settlement application is executed by first CPU 55. First CPU 55 inputs or receives information regarding settlement (for example, amount-of-money information, payment method, and card brand information used for settlement) on the settlement application or from the outside of settlement terminal device 11 (S1).

When receiving the information regarding settlement, first CPU 55 performs a process and a display for prompting a reading operation of the card used for the settlement on first touch panel 41, as shown in FIG. 1A (S2).

The process and display for prompting the reading operation of the card used for the settlement are performed before it is confirmed that reading of the card is performed ("No" in step S3). When it is confirmed that the reading of the card is performed ("Yes" in step S3), first CPU 55 starts an authentication procedure of the card.

An authentication method of the card is determined based on, for example, the type of the card used for the settlement, information regarding the card, or a contract concluded between a settlement center and a member store (credit card member store that conducts credit card transaction) that uses settlement terminal device 11.

When the authentication method is performed using the PIN ("PIN" in step S4), second CPU 93 displays PIN input screen 47 on second touch panel 45 disposed on second information processing unit 19 (S5), and waits for the input completion of the PIN by a user (customer) of the card ("No" in step S6). PIN input screen 47 is, for example, a screen capable of inputting the PIN shown in FIG. 1A. PIN input screen 47 is displayed, for example, before it is confirmed that the input of the PIN is completed.

When it is confirmed that the input of the PIN is completed ("Yes" in step S6), second CPU 93 waits until a comparison result of whether or not the input PIN matches a PIN registered in the card used for the settlement or a PIN registered in the settlement center is obtained ("No" in step S7).

The PINs are compared in, for example, the settlement center. Second CPU 93 encrypts the PIN input in step S6, and transmits the encrypted PIN and the card information to the settlement center through second IF 91, first IF 77, and first CPU 55.

The settlement center decodes the PIN received from settlement terminal device 11, and compares the decoded PIN with the PIN managed in the settlement center. When these two PINs match each other and it is confirmed that there is no problem in the card having the card information transmitted together with the PIN (for example, the card is not on a blacklist) (YES of step S7), the settlement center grants credit to settlement terminal device 11.

First CPU 55 is granted credit from the settlement center, and performs a sales process as a subsequent settlement process (S8), and ends communication with the settlement center. First CPU 55 may transmit sales process data to the settlement center before the communication with the settlement center is ended after the sales process is completed, or may transmit the sales process data and sales process data of another settlement later.

When these two PINs do not match (NO in step S7), the settlement center notifies that settlement terminal device 11 is not granted credit to settlement terminal device. When first CPU 55 is notified from the settlement center, first CPU does not perform the sales process, and stops the settlement (S9).

When the authentication method is performed using the PIN, the comparing of the PINS may be performed between settlement terminal device 11 and the credit card (not shown) read by settlement terminal device 11. When the comparison result that the PIN input in step S6 matches a PIN registered in a chip (not shown) within the credit card in advance is obtained from the chip within the credit card (YES of step S7), second CPU 93 performs the sales process as the sequent settlement process (step S8).

First CPU 55 may transmit the sales process data to the settlement center immediately after the sales process is completed and before the communication with the settlement center is ended, or may transmit the sales process data and sales process data of another settlement later. When the comparison result that two PINs do not match is obtained (NO of step S7), the sales process is stopped in settlement terminal device 11, and the settlement is stopped (step S9).

Meanwhile, when the authentication method is performed using the signature ("signature" in step S4), second CPU 93 displays signature input screen 49 on second touch panel 45 disposed in second information processing unit 19 (step S10), and waits until the input of the signature by the user of the card is completed ("No" in step S11). Signature input screen 49 is, for example, a screen capable of inputting the signature shown in FIG. 2A. Signature input screen 49 is displayed, for example, before it is confirmed that the input of the signature is completed. When it is confirmed that the input of the signature is completed ("Yes" in step S11), second CPU 93 performs the settlement process through second IF 91, first IF 77, and first CPU 55 (S8).

When the authentication method of the credit card in step S4 is performed using the signature (step S4, signature), first CPU 55 performs credit inquiry of the settlement, and when first CPU is notified that the credit inquiry succeeds (is granted credit), first CPU may perform the sales process, and display a screen capable of inputting the signature.

The above-described operation example is performed by cooperation between "secure" second information processing 19 and first information processing unit 17 provided in settlement terminal device 11. The settlement application is operated in first information processing unit 17. The display of the information regarding settlement (for example, amount-of-money information, payment method, and card brand information used for settlement) or the display for prompting the reading operation of the card used for the settlement may be performed in any one of first information processing unit 17 or "secure" second information processing unit 19.

Meanwhile, PIN input screen 47 or signature input screen 49 is displayed by second touch panel 45 disposed in "secure" second information processing unit 19. PIN input screen 47 or signature input screen 49 are displayed before the input of the PIN or signature by the user of the card is completed after the display for prompting the reading operation of the card used for the settlement is performed and the card to be used is read.

As mentioned above, settlement terminal device 11 can input and display the authentication information (for example, signature or PIN) of the card used for the settlement by the customer, and can secure the "tamper resistance". The application software for the settlement can be flexibly operated without stress.

In settlement terminal device 11 of the present exemplary embodiment, secure second information processing unit 19 can be disposed while being isolated from first information processing unit 17. Thus, second information processing unit 19 can be intensively disposed as secure module 109 in a necessary minimum space. Accordingly, second information processing unit 19 easily secures the tamper resistance (security). Second touch panel 45 for security is separately provided in addition to first touch panel 41, and thus, the operator can easily recognize that the second touch panel is a secure input region. As stated above, settlement terminal device 11 can notify that second touch panel 45 is a region that guarantees input safety of the authentication information (PIN or the like) to the operator. As a result, the authentication information can be safely input, and a secure process of the input authentication information is realized. Second information processing unit 19 provided with second touch panel 45 may include a housing having a color (and surface process) different from that of first information processing unit 17. A background color of the display in second touch panel 45 for security may be a color different from a background color of the display in first touch panel 41 provided in first information processing unit 17. Due to different background colors, the operator can be notified that second touch panel 45 is a region which guarantees the input safety of the authentication information (PIN or the like).

In settlement terminal device 11, when first main body 53 is attached to seat unit 25 of second main body 51, first housing 21 and second housing 23 are integrally combined. Second housing 23 and first housing 21 have outer shells such that internal regions thereof are spaces. Accordingly, an information processing device in which first housing 21 is integrally provided at seat unit 25 of second housing 23 has double outer shells at a coupling boundary. Thus, in the information processing device in which first main body 53 and second housing 23 are combined, strength of a portion of the double outer shells is structurally increased due to the presence of double walls.

In settlement terminal device 11, first main body 53 is attached to seat unit 25 of second main body 51, the first input display unit and the second input display unit are arranged on the same plane. Thus, it is easy to perform an operation requiring security in which the second input display unit of second main body 51 is used while recognizing the first input display unit of first main body 53.

In settlement terminal device 11, magnetic card reader 13 is disposed in first information processing unit 17 separated from secure second information processing unit 19. Accordingly, second information processing unit 19 can be intensively disposed in a necessary minimum space. Thus, in second information processing unit 19, it is easy to physically secure the tamper resistance. As a result, settlement terminal device 11 can simultaneously implement usability of a reading swipe operation of the magnetic card while securing high-level security for securely inputting the authentication information such as the PIN.

Second Exemplary Embodiment

Figure 6A:
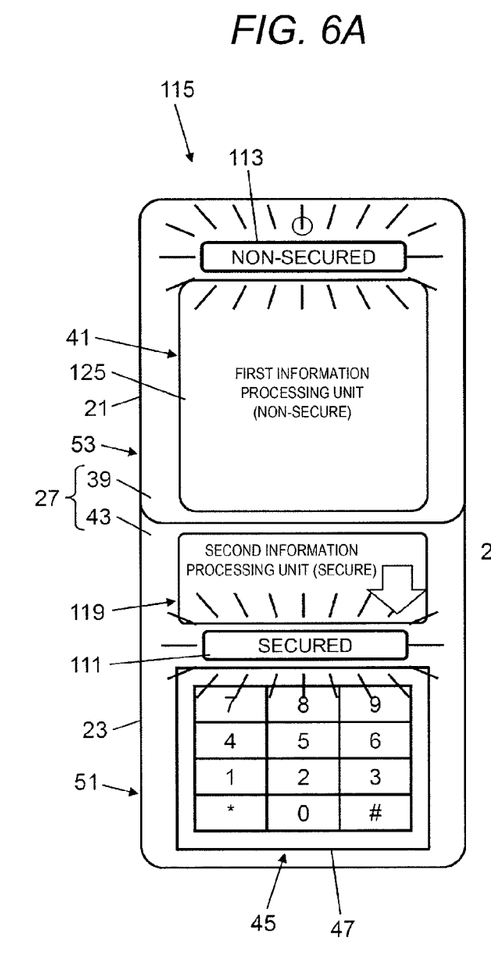
FIG. 6A is a plan view of a settlement terminal device of a second exemplary embodiment in which a secure LED display unit and non-secure LED display unit are provided.
Figure 6B:
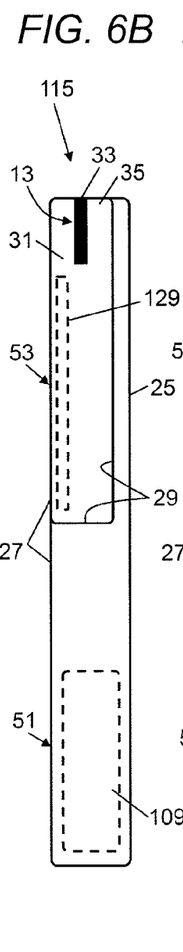
FIG. 6B is a side view of the settlement terminal device shown in FIG. 6A.
Figure 6C:
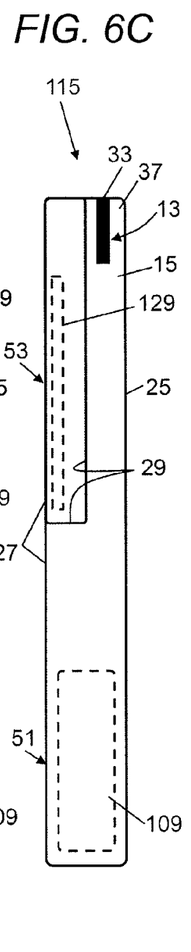
FIG. 6C is a side view when a magnetic card reader of the settlement terminal device shown in FIG. 6A is disposed at a seat-unit upper end.

FIG. 6A is a plan view of settlement terminal device 115 of second exemplary embodiment in which secure LED display unit 111 and non-secure LED display unit 113 are provided. FIG. 6B is a side view of settlement terminal device 115 shown in FIG. 6A. FIG. 6C is a side view when magnetic card reader 13 of settlement terminal device 115 shown in FIG. 6A is disposed at seat-unit upper end 15. In the following exemplary embodiment, the same members and parts as those shown in FIGS. 1A to 4 will be assigned the same reference numerals, and the redundant description thereof will be omitted.

In settlement terminal device 115 of the present exemplary embodiment, secure LED display unit 111 as an example of a secure notification unit that performs secure notification (for example, display or lighting) indicating that second information processing unit 19 is in a secure mode is disposed between first touch panel 41 and second touch panel 45. In settlement terminal device 115 of the present exemplary embodiment, non-secure LED display unit 113 as an example of a non-secure notification unit that performs non secure notification (for example, display or lighting) indicating that first information processing unit 17 is in a non-secure mode is disposed on a side opposite to secure LED display unit 111 with first touch panel 41 interposed therebetween.

In settlement terminal device 115, the third input display unit (specifically, third touch panel 119) including secure display region 117 which displays secure content is disposed between first touch panel 41 and second touch panel 45. Third touch panel 119 includes third display unit 121 (see FIG. 3), and third touch input detecting unit 123. Third display unit 121 has a function of controlling displaying on third touch panel 119. Third touch input detecting unit 123 has a function of detecting a touch input on third touch panel 119.

In settlement terminal device 115, second touch panel 45 and secure LED display unit 111 are provided at a position where these touch panels are adjacent to each other at a front side. Second touch panel 45 and secure LED display unit 111 are arranged while being separated from positions of first touch panel 41 and non-secure LED display unit 113, and thus, the operator can easily recognize that the second touch panel and the secure LED display are secure input regions, and can safely input the authentication information. That is, it is possible to more accurately distinguish between the non-secure region and the secure region. As mentioned above, since settlement terminal device 115 can allow the operator to explicitly recognize that the second touch panel and the secure LED display are regions which guarantee the input safety of the authentication information, it is possible to securely process the input authentication information. By easily distinguishing between the non-secure region and the secure region, it is possible to secure non-secure display region 125 of first touch panel 41 wider than the breadth (length or width) of secure display region 117 of second touch panel 45. Thus, it is possible to increase flexibility and diversity of the display from the application in first touch panel 41.

In settlement terminal device 115, second touch panel 45 and the third input display unit are provided at a position where the second touch panel and the third input display unit are adjacent to each other. Second touch panel 45 and the third input display unit are arranged while being separated from a position of non-secure first touch panel 41. As mentioned above, in settlement terminal device 115, second touch panel 45 and the third input display unit (specifically, third touch panel 119) are grouped, and are separated from first touch panel 41. Thus, it is possible to allow the operator to more explicitly recognize that second touch panel 45 is a region which guarantees the input safety of the authentication information (PIN or the like). As a result, it is possible to safely input the authentication information, and it is possible to implement the secure process of the input authentication information. By more easily distinguishing between the non-secure region and the secure region, it is possible to secure non-secure display region 125 of first touch panel 41 wider than the breadth (length or width) of secure display region 117 of second touch panel 45. Thus, it is possible to increase flexibility and diversity of the display from the application in first touch panel 41.

Settlement terminal device 11 or 115 as an example of the information processing device according to the present invention has a specific configuration described below in addition to the configuration described in the aforementioned exemplary embodiments. That is, the settlement terminal device includes a read/write control unit of non-contact IC card read/write unit 127 in second information processing unit 19 on a secure side.

According to the settlement terminal device in which the read/write control unit of non-contact IC card read/write unit 127 (see FIG. 4) is provided on the secure side, it is possible to guarantee information security.

Settlement terminal device 11 includes loop antenna 129 of non-contact IC card read/write unit 127 in first information processing unit 17 on a non-secure side. According to the settlement terminal device in which loop antenna 129 of non-contact IC card read/write unit 127 is provided in first information processing unit 17, it is possible to obtain an overlapped wide area with first touch panel 41.

Settlement terminal device 11 can allow a housing surface of a secure input/output unit and a housing surface of a non-secure input/output unit to have different colors. According to settlement terminal device 11 in which the housing surface of the secure input/output unit and the housing surface of the non-secure input/output unit have different colors, since a mistake of the user does not easily occur, it is possible to implement a relieved authentication process and a settlement process.

Settlement terminal device 11 can allow the background color of secure display region 117 and the background color of non-secure display region 125 to have different colors. According to settlement terminal device 11 in which the background color of secure display region 117 and the background color of non-secure display region 125 have different colors, since a mistake of the user does not easily occur, it is possible to implement a relieved authentication process and a settlement process.

Accordingly, according to settlement terminal device 11 of the exemplary embodiments, the secure portion can secure physically high tamper-resistance performance, and the high robustness of the entire device.

Although various exemplary embodiments have been described with reference to the drawings, the present disclosure is not limited to the exemplary embodiments. It should be understood to those skilled in the art that various modifications or changes can be conceived within the categories described the scope of the claims, and these modification or changes are included in the technical scope of the present disclosure.

What is claimed is:

1. A portable settlement terminal device comprising:
   a first housing main body that accommodates a non-secure first information processor, a settlement application, a task application, and a first input display, the non-secure first information processor configured to execute the settlement application and cause the first input display to display an amount of money related to a settlement, the non-secure first information processor further configured to execute the task application for executing a task other than the settlement;
   a second housing main body that accommodates a secure second information processor, a seat, and a second input display, the secure second information processor configured to cooperate with the non-secure first information processor during execution of the settlement application by the non-secure first information processor to cause the second input display to prompt for authentication information of a card used for the settlement, the first housing main body being detachably attached to the seat, the seat extending from the second housing main body; and
   a magnetic card reader, including a slit, that is disposed in the seat of the second housing main body, wherein
   when the first housing main body is attached to the seat, both the first input display and the second input display are operative, viewable and provided on a same plane, and
   when the first housing main body is attached to the seat, the slit of the magnetic card reader extends along a surface of the seat and is substantially parallel to the first input display or the second input display.

2. The portable settlement terminal device of claim 1, wherein operation surfaces of the first input display and the second input display are provided on the same plane, and the operation surfaces are touch panels.

3. The portable settlement terminal device of claim 1, wherein a secure notifier that performs secure notification indicating that the second information processor is in a secure mode having tamper resistance, is disposed in the second housing main body, and
   a non-secure notifier that performs non-secure notification indicating that the first information processor is in a non-secure mode which does not have tamper resistance, is disposed in the first housing main body.

4. The portable settlement terminal device of claim 3, wherein a third display that includes a secure display region which displays secure content, is disposed in the second housing main body.

5. The portable settlement terminal device of claim 1, wherein the magnetic card reader is disposed at a seat upper end of the seat of the second housing main body, the magnetic card reader being provided on a side opposite to the second input display with the first input display interposed between the second input display and the magnetic card reader.

6. The portable settlement terminal device of claim 1, wherein the second input display includes input information, by a card user, for a same transaction as the amount of money displayed on the first input display.

7. The portable settlement terminal device of claim 1, wherein a position of the second input display is lower than a position of the first input display.

8. The portable settlement terminal device of claim 1, wherein the seat is positioned on a perpendicular line to the first input display.

9. The portable settlement terminal device of claim 1, a thickness of the second housing main body is substantially equal to a sum of a thickness of the first housing main body and a thickness of the seat.

10. The portable settlement terminal device of claim 1, wherein the first input display is wider than a breadth of the second input display.

11. The portable settlement terminal device of claim 1, wherein a general-purpose operating system is executed by the non-secure first information processor as a software platform.

12. The portable settlement terminal device of claim 1, wherein the first housing main body comprises a smart phone or a tablet.

13. The portable settlement terminal device of claim 1, wherein the seat includes the magnetic card reader for settling the amount of money, the magnetic card reader being in a seat upper end surface of the seat of the second housing main body for decreasing a thickness of the first housing main body.

14. The portable settlement terminal device of claim 1, wherein the non-secure first information processor supplies power to the second housing main body by controlling a power supply.

15. The portable settlement terminal device of claim 14, wherein the first housing main body includes the power supply.

16. The portable settlement terminal device of claim 1, wherein the plane on which the first input display and the second input display are provided is substantially parallel to the first input display and the second input display.

17. The portable settlement terminal device of claim 1, wherein the first input display is not overlapped with the second input display when viewed from a perpendicular direction to the first input display.

18. A portable settlement terminal device comprising:
   a first housing main body that accommodates a non-secure information processor, a settlement application, and a task application, the first housing main body including a first surface;
   a first input display, on the first surface, that displays non-secure information related to the settlement application;
   a second housing main body that accommodates a secure information processor, and includes a second surface and a seat surface;
   a second input display, on the second surface, that displays secure information which is input by a user and corresponds to the non-secure information displayed on the first input display related to the settlement application; and
   a magnetic card reader, including a slit, that is disposed in the second housing main body, wherein the first housing main body is detachably attached to the second housing main body, when the first housing main body is attached to the second housing main body, the first housing main body is positioned on the seat surface, the seat surface being lower than the second surface on which the second input display is disposed in a side view of the portable settlement terminal device with the first input display and the second input display facing upward in the side view, when the first housing main body is attached to the second housing main body, the slit of the magnetic card reader extends along a surface of the seat surface and is substantially parallel to the first surface or the second surface, the non-secure first information processor is configured to execute the settlement application to cause the first input display to display non-secure information related to the settlement application, the non-secure first information processor is further configured to execute the task application for executing a task other than a settlement of the settlement application, and the secure second information processor is configured to cooperate with the non-secure first information processor during execution of the settlement application by the non-secure first information processor to cause the second input display to display the secure information which corresponds to the non-secure information.

19. The portable settlement terminal device of claim 18, wherein
the non-secure information includes an amount of money related to the settlement,
the secure information includes authentication information of a card used for the settlement, and
when the first housing main body is attached to the second housing main body, the first input display and the second input display are substantially on a same place.

20. A portable settlement terminal device comprising:

a first housing main body that accommodates a non-secure first information processor, a settlement application, a task application, and a first input display, the non-secure first information processor configured to execute the settlement application and cause the first input display to display an amount of money related to a settlement, the non-secure first information processor further configured to execute the task application for executing a task other than the settlement; and a second housing main body that accommodates a secure second information processor, a seat, and a second input display, the secure second information processor configured to cooperate with the non-secure first information processor during execution of the settlement application by the non-secure first information processor to cause the second input display to prompt for authentication information of a card used for the settlement, the first housing main body being detachably attached to the seat, the seat extending from the second housing main body; and a magnetic card reader, including a slit, that is disposed in the second housing main body, wherein when the first housing main body is attached to the seat, the first input display and the second input display are provided on a same plane, when the first housing main body is attached to the seat, the settlement is configured to be processed with the first input display and the second input display by a user, and when the first housing main body is attached to the seat, the slit of the magnetic card reader extends along a surface of the seat and is substantially parallel to the first input display or the second input display.

* * * * *